United States Patent [19]

Spurrier

[11] 4,230,959
[45] Oct. 28, 1980

[54] MAGNETOHYDRODYNAMIC (MHD) CHANNEL CORNER SEAL

[75] Inventor: Francis R. Spurrier, Pittsburgh, Pa.

[73] Assignee: The United States of America as represented by the United States Department of Energy, Washington, D.C.

[21] Appl. No.: 18,099

[22] Filed: Mar. 6, 1979

[51] Int. Cl.³ .......................................... H02K 45/00
[52] U.S. Cl. ................................................ 310/11
[58] Field of Search .................................. 310/11, 10

[56] References Cited

U.S. PATENT DOCUMENTS

| | | | |
|---|---|---|---|
| 3,432,715 | 3/1969 | Yerouchalmi | 310/11 X |
| 3,450,905 | 6/1969 | Yerouchalmi | 310/11 |
| 3,453,459 | 7/1969 | Weh | 310/11 |
| 3,454,798 | 7/1969 | Yerouchalmi | 310/11 |
| 3,475,627 | 10/1969 | Richez et al. | 310/11 |
| 3,514,646 | 5/1970 | Ito et al. | 310/11 |
| 3,524,087 | 8/1970 | DuBois et al. | 310/11 |

*Primary Examiner*—Donovan F. Duggan
*Attorney, Agent, or Firm*—James E. Denny; Dean E. Carlson; Frank H. Jackson

[57] ABSTRACT

A corner seal for an MHD duct includes a compressible portion which contacts the duct walls and an insulating portion which contacts the electrodes, sidewall bars and insulators. The compressible portion may be a pneumatic or hydraulic gasket or an open-cell foam rubber. The insulating portion is segmented into a plurality of pieces of the same thickness as the electrodes, insulators and sidewall bars and aligned therewith, the pieces aligned with the insulator being of a different size from the pieces aligned with the electrodes and sidewall bars to create a stepped configuration along the corners of the MHD channel.

8 Claims, 6 Drawing Figures

MAGNETOHYDRODYNAMIC (MHD) CHANNEL CORNER SEAL

CONTRACTUAL ORIGIN OF THE INVENTION

The invention described herein was made in the course of, or under, a contract with the U.S. DEPARTMENT OF ENERGY.

BACKGROUND OF THE INVENTION

This invention relates to a magnetohydrodynamic (MHD) channel corner seal. In more detail the invention relates to a seal which will impede leakage of working fluid along the corners of the channel while accommodating expansion of electrodes, sidewall bars and insulators when the channel is brought up to working temperature.

A known design for an MHD channel utilizes a fiberglass duct as the main structural and pressure containing member. Incorporated within this duct and supported at midpoints along their lengths are electrodes, sidewall bars and insulators. These elements expand towards the corners of the duct when the channel is brought up to operating temperature. A corner seal is therefor required which will accommodate these expansion motions while effectively impeding the leakage of working fluid along the corners.

SUMMARY OF THE INVENTION

A corner seal for an MHD duct according to the present invention includes a compressible portion which contacts the duct walls and an insulating portion which contacts the electrodes, sidewall bars and insulators. The compressible portion may be a pneumatic or hydraulic gasket or an open-cell foam rubber gasket. The insulating portion is segmented into a plurality of pieces of the same thickness as the electrodes, insulators and sidewall bars and aligned therewith, the pieces aligned with the insulator being of a different size from the pieces aligned with the electrodes and sidewall bars to create a stepped configuration along the corners of the MHD channel.

DETAILED DESCRIPTION OF THE INVENTION

Figure 1:
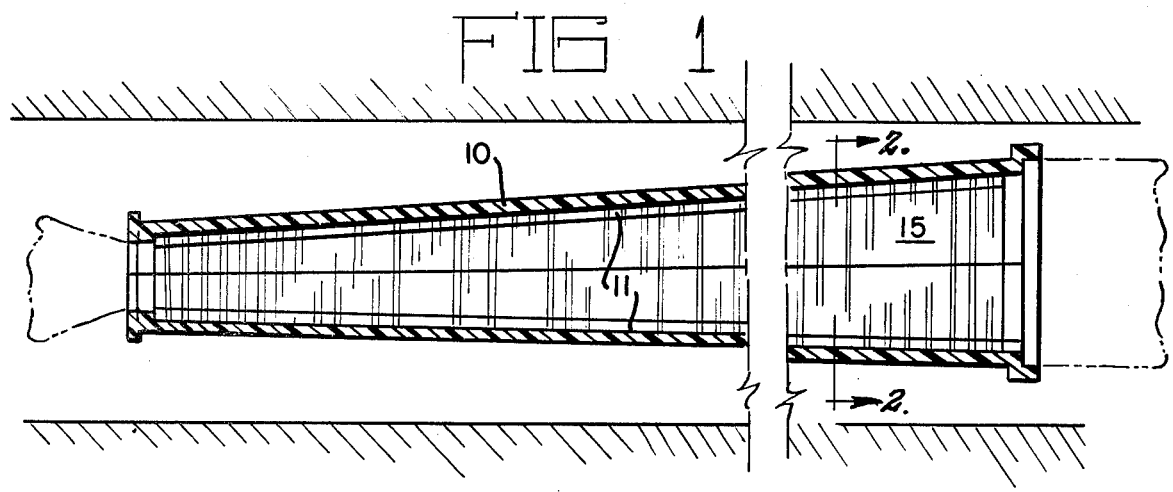
FIG. 1 is a sketch in longitudinal section of an MHD channel.
Figures 2, 3:
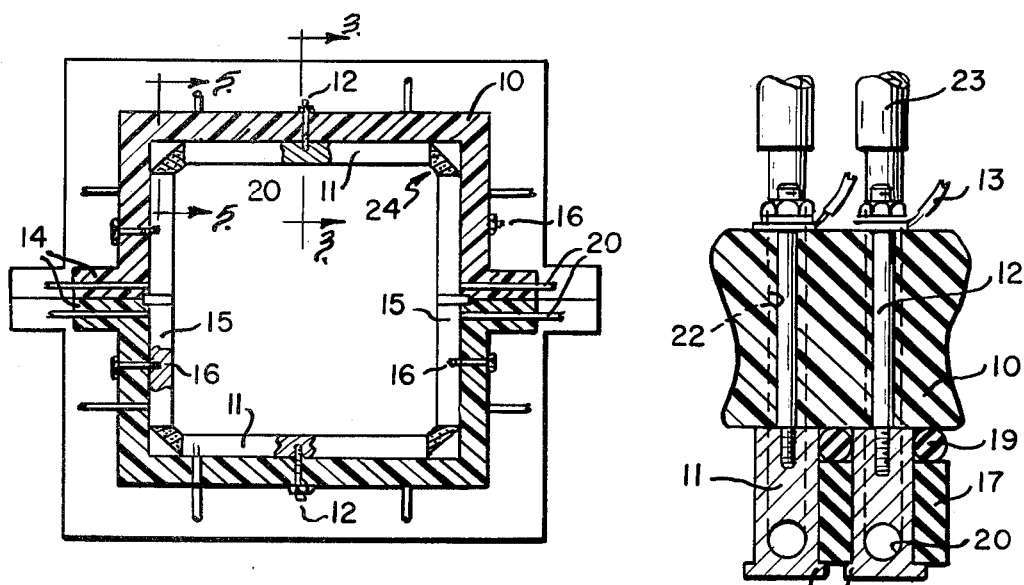
FIG. 2 is an enlarged transverse section thereof with parts broken away taken on the line 2—2 in FIG. 1.
FIG. 3 is a greatly enlarged section taken on the line 3—3 in FIG. 2 through the channel wall at the center bolt position.

Referring first to FIGS. 1-3 of the drawing a previously proposed MHD channel comprises a fiberglass duct 10, square in cross section, which increases in cross section from inlet to outlet. Duct 10 defines a passageway for a working fluid consisting of electrically conducting gas or plasma. Copper or corrosion resistant steel electrodes 11 extend transversely across the top and bottom of the channel and are attached at their midpoints to duct 10 by bolts 12 which also serve as the electrical terminals for the electrodes. Lead wires 13 are attached to bolts 12 outside the duct 10 and are lead from groups of electrodes through non-metallic conduit (not shown) to the channel outlet.

Duct 10 is split at its horizontal midplane and provided with bolting flanges 14 to allow access to the electrodes. Sidewall bars 15 are made of copper or corrosion-resistant steel and extend transversely across the sides of duct 10 in longitudinally disposed pairs, each bar 15 being attached at its midpoint to duct 10 by bolts 16.

As shows specifically in FIG. 3 boron nitride insulators 17 extend transversely across the channel between electrodes 11, and are held in place by lips 18 on the electrodes. Rubber O-ring strip seals 19 are held against the fiberglass duct by the insulators. Retention of the boron nitride insulator pieces by the electrodes and sidewall bars allows individual replacement of an individual electrode without disturbing the remainder of the assembly. It will be observed that a stepped electrode to insulator geometry results thereby which should be beneficial in enhancing the thickness of the slag layers on the insulator thus reducing heat conduction to them. The stepped geometry creates especially favorable condition for slag deposition in the corners, thus further enhancing sealing. Electrodes 11 and sidewall bars 15 are provided with internal coolant passages 20 to remove the heat deposited in them from the working fluid. Water is supplied to the cooling passages through small diameter tubes 21 brazed into each end of the electrodes and sidewall bars which pass through small, suitably located holes 22 in the fiberglass duct walls. Small diameter rubber (or other electrically insulating material) hose 23 connect the electrodes and sidewall bars to fiberglass manifold pipes (not shown) that extend axially along the outside of the channel.

As has previously been noted electrodes 11, insulators 17 and sidewall bars 15 expand towards the corners of the duct when the channel is brought up to operating temperature. Corner seal 24 constructed in accordance with the present invention is therefor provided to accommodate this expansion while impeding leakage of working fluid along the corners of the channel.

Corner seals 24 are disposed in the corners of fiberglass duct 10 and extend the length of the channel. The seals are split diagonally into a compressible portion 25— shown in FIG. 4 as a pneumatic gasket 26 and in FIG. 6 as a foam rubber gasket 27— which fits into the corners of the channel and contacts the fiberglass duct and an articulated insulating portion which contacts the ends of the insulators, electrodes and sidewall bars. This boron nitride insulating portion is divided laterally into a plurality of pieces 28a of the same thickness as the sidewall bars 15 and electrodes 11 which they contact and a plurality of pieces 28b of the same thichness as the insulators 17 which they contact. It will be appreciated accordingly that the insulators 17 separate sidewall bars 15 and that sidewall bars 15 and insulators 17 therebetween are the same thickness as the electrodes 11 and insulators 17 disposed therebetween. To provide a high impedance path for working fluid, the triangular pieces aligned with and contacting electrodes 11 and sidewall bars 15 are of greater height than are the pieces aligned with and contacting the insulators 17. This is clearly seen upon looking at FIGS. 4, 5 and 6.

Figure 4:
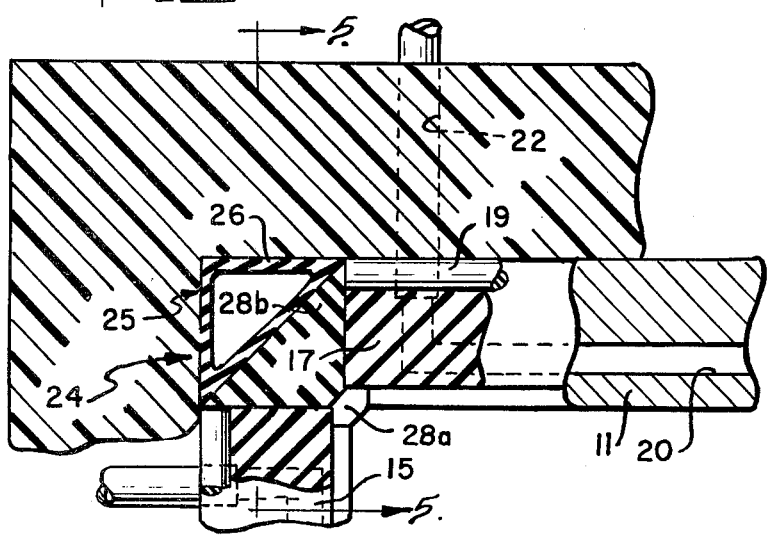
FIG. 4 is a section showing the corner seal of the present invention taken in the plane of an insulator and showing one form of compressible member.
Figure 5:
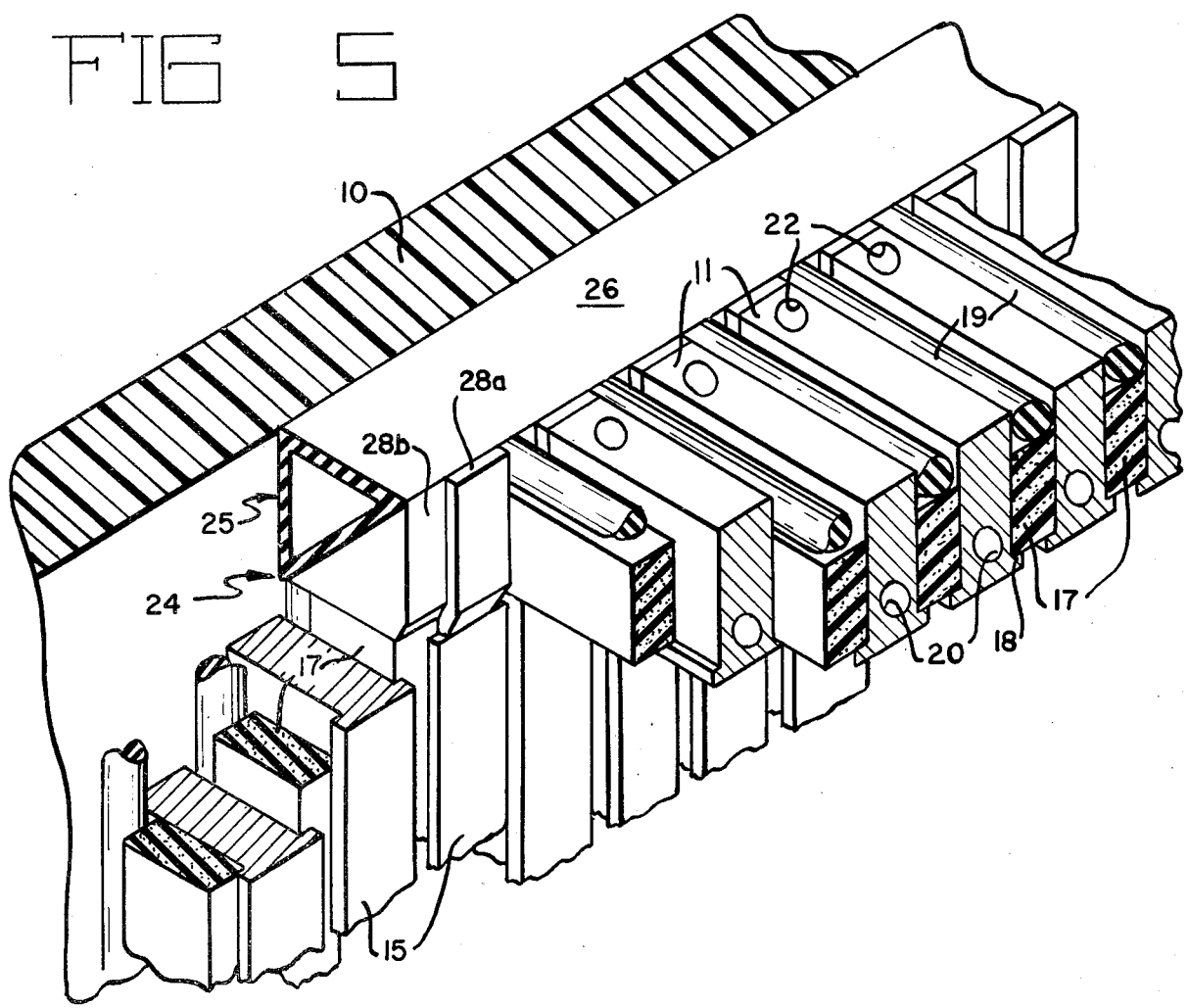
FIG. 5 is an isometric view showing one corner of an MHD channel with parts broken away and with a corner seal in position.
Figure 6:
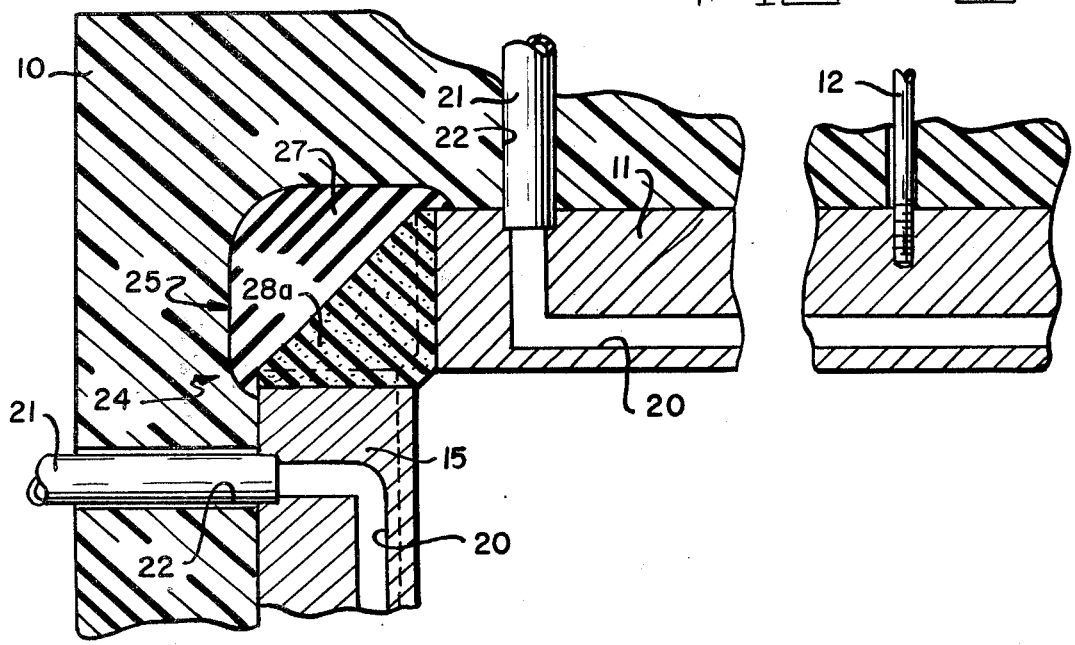
FIG. 6 is similar to FIG. 4 except that the section is taken at the plane of an electrode and shows a different form of compressible member.

Referring now specifically to the embodiment of FIG. 4, flexible elastomer gasket 26 may be pressurized from any convenient high pressure source as by opening one end of its hollow interior to the gas pressure at the channel inlet end. With reference to the embodiment of FIG. 6, elastomer material such as foam rubber is employed as the compressible member. In this case it is important that the foam rubber not be collapsed by the rising pressure in the duct as the MHD plant is started up. To this end, an open pore matrix in the rubber is desirable to enable pressure equalization to occur. The force required to seat the seal piece would then be produced by stresses in the rubber only. In the case of this embodiment, to provide a larger body of elastomer material the plexiglass conduit is cut away at the corner as shown in FIG. 6.

The embodiments of the invention in which an exclusive property or privilege is claimed are defined as follows:

1. In a magnetohydrodynamic channel including an elongated duct, rectangular in cross section, which defines a passageway for an electrically conducting working fluid and which has electrodes and insulators extending transversely across opposed faces of the channel said insulators being disposed between the electrodes said electrodes being supported from the duct at midpoints along their length, the improvement comprising seals disposed in the corners of the duct and extending the length of the channel to impede leakage of working fluid along the corners of the duct, said seals including a compressible portion which contacts the duct and an insulating portion which contacts the electrodes and insulators, said insulating portion being segmented into pieces of the same thickness as the electrodes and insulators and aligned therewith, the pieces aligned with the insulators being of a different size from the pieces aligned with the electrodes to create a stepped configuration along the corners of the duct.

2. Improvement according to claim 1 wherein the corner seal is split on a diagonal to form the compressible portion and the insulating portion.

3. Improvement according to claim 1 wherein the pieces aligned with the electrodes are of greater height than the pieces aligned with insulators.

4. Improvement according to claim 1 wherein the compressible portion comprises a pneumatic gasket.

5. Improvement according to claim 1 wherein the compressible member is formed of open-cell foam rubber.

6. Improvement according to claim 1 wherein the duct is formed of fiberglass, the electrodes are formed of copper or corrosion resistant steel and the insulators are formed of boron nitride.

7. Improvement according to claim 1 wherein the electrodes and sidewall bars have internal cooling passages therein and means for passing water through said internal cooling passages.

8. An MHD channel comprising an elongated fiberglass duct, square in cross-section and increasing in cross-sectional area from inlet to outlet which defines a passageway for an electrically conducting plasma, copper or corrosion resistant steel electrodes supported from the duct at their midpoint extending transversely across the top and bottom of the MHD channel, boron nitride insulators held in place by the electrodes extending transversely across the top and bottom of the MHD channel between the electrodes, O-ring strip seals disposed between the insulators and the fiberglass duct and held in place by the insulators, said fiberglass duct being split at its horizontal midplane, pairs of longitudinally aligned copper or corrosion resistant steel sidewall bars fastened at their midpoints to the duct extending transversely across the side walls of the duct, pairs of longitudinally aligned boron nitride insulators extending transversely across the side walls of the duct between the sidewall bars and held in place thereby, O-ring strip seals disposed between these insulators and the duct, said sidewall bars and insulators being of the same thickness and aligned with the electrodes and insulators on the top and bottom walls of the duct, said electrodes and sidewall bars have internal cooling passages therein, means for passing water through said internal coolant passages, and seals disposed in the corners of the duct and extending the length of the channel to impede leakage of plasma along the corners of the duct, said seals being split diagonally into a compressible portion which contacts the duct and an insulating portion which contacts the electrodes, sidewall bars and insulators, said insulating portions being segmented into pieces of the same thickness as the electrodes, sidewall bars and insulators with which they are aligned, the pieces aligned with the electrodes and sidewall bars being longer than the pieces aligned with the insulators which creates a stepped configuration along the corners of the duct.

* * * * *